United States Patent [19]

Mio et al.

[11] Patent Number: 4,857,384

[45] Date of Patent: Aug. 15, 1989

[54] EXOTHERMIC CONDUCTING PASTE

[75] Inventors: Mitsushi Mio, Sumoto Hyogo; Hisao Negita, Higashi, both of Japan

[73] Assignee: Awaji Sangyo K. K., Hyogo, Japan; part of interest

[21] Appl. No.: 55,606

[22] Filed: May 29, 1987

[30] Foreign Application Priority Data

| | | | |
|---|---|---|---|
| Jun. 6, 1986 | [JP] | Japan | 61-131162 |
| Jan. 29, 1987 | [JP] | Japan | 62-17333 |
| Jan. 29, 1987 | [JP] | Japan | 62-17334 |

[51] Int. Cl.[4] .......................... B32B 3/00; H05B 3/16; H01B 5/06

[52] U.S. Cl. .................................... 428/164; 219/543; 252/518; 338/308; 428/161; 428/323; 428/328; 428/413; 428/423.1; 428/447; 428/689; 428/702

[58] Field of Search ................ 252/518, 514; 407/101; 428/688, 689, 699, 701, 702, 457, 469, 323, 328, 161, 164; 219/543; 338/308

[56] References Cited

U.S. PATENT DOCUMENTS

| | | | |
|---|---|---|---|
| 3,876,560 | 4/1970 | Kuo et al. | 252/514 |
| 3,936,790 | 2/1976 | Eastwood et al. | 252/518 |
| 3,947,277 | 3/1976 | Carnahan et al. | 252/508 |
| 4,027,004 | 5/1977 | Sleight | 252/518 |
| 4,107,387 | 8/1978 | Boonstra et al. | 252/518 |
| 4,186,423 | 1/1980 | Yoshida et al. | 252/514 |
| 4,499,011 | 2/1985 | Boonstra et al. | 252/518 |

*Primary Examiner*—George F. Lesmes
*Assistant Examiner*—James B. Monroe
*Attorney, Agent, or Firm*—Stephen F. K. Yee

[57] ABSTRACT

Disclosed are an exothermic conducting paste mainly comprising a synthetic resin and a heat stable metal oxide which is positive in temperature coefficient of electric resistance and has an electric specific resistance of not more than $5\times10^3$ μΩcm at ordinary temperature, and an electric resistance heating unit wherein a desirably shaped solid or solid surface is coated or impregnated with said paste. This heating unit has an uniform temperature distribution, is adjustable to any desired temperature below 350° C., and further can be formed in various shapes.

4 Claims, 3 Drawing Sheets

FIG. 3a
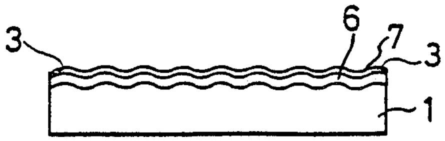
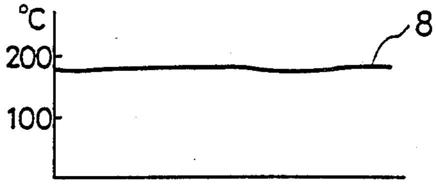
FIG. 3b
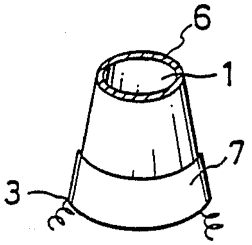
FIG. 4
FIG. 5a
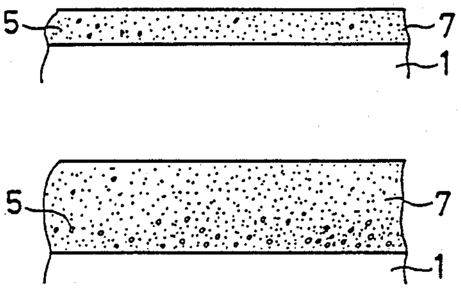
FIG. 5b

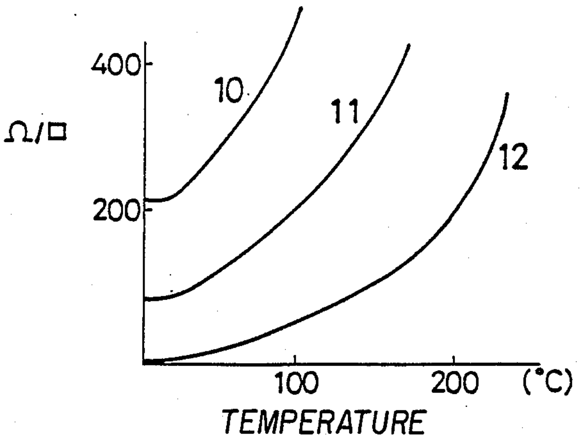
FIG. 6
FIG. 7a
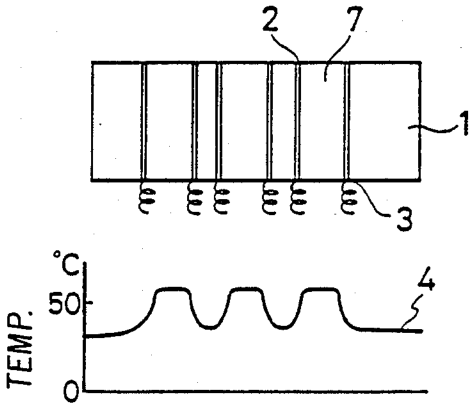
FIG. 7b
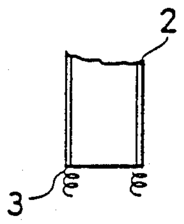
FIG. 7c

EXOTHERMIC CONDUCTING PASTE

BACKGROUND OF THE INVENTION (1) Technical Field

The present invention relates to an exothermic conducting paste or coating and an electric resistance heating unit, particularly to an exothermic conducting paste for providing an electric resistance heating unit which generates an uniform temperature distribution at any temperature and has the temperature self-controlling property, and an electric resistance heating unit which is arbitrarily adjustable to a desired temperature below 350° C.

(2) Background Information

Japanese Patent Publication No. 60-59131/1985 discloses a planar electric heating element comprising a synthetic resin band having conductive fine powder such as carbon black or graphite incorporated therein and electrode wires buried in the band at both ends in the longitudinal direction thereof. The temperature of this element can be increased to about 60° C. A heating unit comprising a solid lined with this element is also known.

However, the carbon black or graphite powder is high in electric specific resistance (5,000 to 20,000 μΩcm) and negative in temperature coefficient of electric resistance (about −2.6 μΩcm/°C.). Accordingly, for the heating unit containing such a conductive fine powder, the distance between electrodes on a coated film is narrow, for example, and a large heating surface having an uniform temperature distribution can not be obtained. In the heating unit wherein the conductive fine powder such as carbon black or the like is used, there is utilized the tape-shaped heating element which is formed by melt extrusion from the synthetic resin having this conductive fine powder incorporated therein. Heating units having a large heating surface are seldom prepared by the use of a paste or paint containing such a conductive fine powder.

Since the conventional heating unit was in danger of local oxidation or damage by burning, the temperature of this unit could only be increased to a temperature below about 60° C.

For example, in the conventional heating unit, a substrate 1 is lined with a planar heating element (tape) 2 as shown in FIGS. 7*a* and 7*c*. When electricity is supplied through metal terminals 3, a heating part 7 is heated and a temperature distribution 4 as shown in FIG. 7*b* developed.

Thus, the conventional conductive powder such as carbon black or the like is high in electric specific resistance and negative in temperature coefficient of electric resistance. Accordingly, for the heating unit containing such a conductive powder, the distance between electrodes on the coated film, the tape or the like can not be widen and the large heating surface having an uniform temperature distribution can not be obtained. When the substrate is coated with the paste or coating containing such a conductive powder, the thickness of the coated film must be precisely controlled. It is further necessary that the paste or coating be applied by a machine, for example, to a thickness of not more than 0.3 mm±0.02 mm, and it is unsuitable that the paste or coating be manually applied. According to the conventional heating unit, more electric current is supplied to a thicker portion on the variation of the thickness of the coated film, and consequently the temperature of that portion is elevated. However, the decrease of electric resistance results in flowing of progressively more electric current, because the conventional conductive fine powder such as carbon black or the like is negative in temperature coefficient of electric resistance. Accordingly, the temperature of that portion becomes still higher, and local damage by melting or by burning is induced thereby.

Further, according to the prior art, the curved surface, the inner surface of the hole or the uneven surface is impossible to be precisely coated therewith by means of the machine. Therefore, the coated film having an uniform thickness can not be obtained and the local heating as described above undesirably takes place. In the conventional planar heating elements, the curved surface, the inner surface of the hole or the uneven surface is difficult to be lined with the element tape, and the width of the element tape is necessarily narrowed because of their high resistance. When applied on the large area, a number of these tapes are used. As a result, the temperature difference occurs between the tapes and the heating part, and accordingly, it is impossible to heat the whole of the wide surface at an uniform temperature. Further, this heating element is only heated to a temperature of about 60° C. and can not be adjusted to a higher desired temperature.

Therefore, there has long been a need for an exothermic conducting paste or coating for providing a heating unit with a large heating surface on which an uniform temperature distribution can be obtained, even if a substrate has a complex structure such as a curved surface, the inner surface of the hole or an uneven surface, and the substrate is coated with the paste or coating to a thickness not so precisely uniform by hand or by impregnation, the local damage by melting or by burning does not take place, and the heating temperature can be freely controlled.

SUMMARY OF THE INVENTION

The present inventors have variously studied heating units, particularly exothermic conducting pastes or coatings for producing the heating units. As a result, it has been found that the problems described above are solved by a paste or coating mainly comprising a specific metal oxide and a synthetic resin, and that an excellent heating unit can be prepared, thus arriving at the present invention.

In accordance with the present invention, there are provided (1) an exothermic conducting heating paste mainly comprising a synthetic resin and a heat stable metal oxide which is positive in temperature coefficient of electric resistance and has an electric specific resistance of not more than $5\times10^3$ μΩcm at ordinary temperature, (2) an electric resistance heating unit wherein a desirably shaped solid or solid surface is coated or impregnated with a coating or paste, said coating or paste mainly comprising a synthetic resin and a heat stable metal oxide which is positive in temperature coefficient of electric resistance and has an electric specific resistance of not more than $5\times10^3$ μΩcm; and (3) a process for preparing an electric resistance heating unit, which comprises coating or impregnating a desirably shaped solid or surface thereof with a coating or paste, said coating or paste mainly comprising a synthetic resin and a heat stable metal oxide which is positive in temperature coefficient of electric resistance and has an electric specific resistance of not more than $5\times10^3$ $\mu\Omega$cm, and then curing it.

BRIEF DESCRIPTION OF THE DRAWINGS

FIGS. 3*a*, 3*b* and 4 are views illustrating a heating unit having a pasts of the present invention applied thereon;

FIGS. 5*a* and 5*b* are schematic views each showing a condition of metal oxide particles dispersed in a paste of the present invention applied on a heating unit;

FIG. 6 is a graph showing the relationship between the electric resistance and the variation in temperature for a heating unit of the present invention; and FIGS. 7*a*, 7*b* and 7*c* are views illustrating a conventional heating unit.

Figure 1:
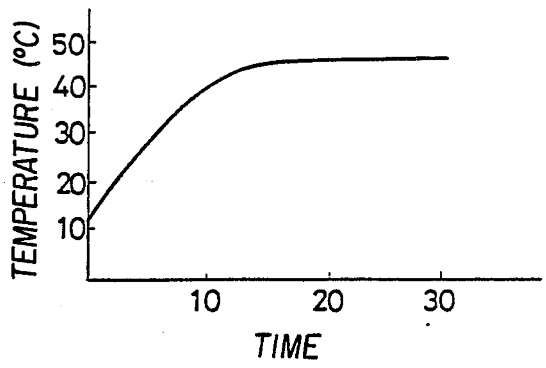
FIGS. 1 and 2 are graphs each showing that a heating surface having a paste of the present invention applied thereon attains a definite stable temperature after the elapse of a definite time.

In the Figures, designated by 1 is a substrate, designated by 2 is a heating element, designated by 3 is a terminal, each of designated by 4 and 8 is a temperature distribution, designated by 5 is an conductive particle, designated by 6 is a ceramic coating and designated by 7 is a heating coated film.

DESCRIPTION OF THE PREFERRED EMBODIMENTS

The metal oxide used in the present invention is positive in temperature coefficient of electric resistance and has an electric specific resistance of not more than $5\times10^3$ $\mu\Omega$cm, preferably less than $1\times10^3$ $\mu\Omega$cm. That is to say, this value is from about 2% to about 30% of that of carbon powder pigment, and the electric resistance increases with increasing temperature. Further, a heat resistive metal oxide is preferable one which is stable at elevated temperatures and is not subject to oxidation and damage by burning. Particularly, the metal oxide which electric resistance rapidly increases with temperature at temperatures below about 350° C. is selected.

Conductive carbon conventionally used in the heating unit of this type is high in electric resistance and negative in temperature coefficient. Further, the heating temperature varies with the variation of the thickness of the film. Therefore, the large heating surface having an uniform temperature distribution can not be obtained Furthermore, the heating surface is in danger of local oxidation or burning.

On the contrary, the metal oxide of the present invention has physicochemical properties opposite to those of the conventional conductive powder. Namely, when the metal oxide of the present invention is used, more electric current is supplied to a thicker portion on the variation of the thickness of the film, and consequently the temperature of that portion is elevated. However, when the temperature is elevated, the resistance increases to lower the electric current flow, because the temperature coefficient of electric resistance is positive. Accordingly, the temperature decreases to be stabilized at an appropriate temperature and local overheating does not occur. Thus, the heating unit with the large heating surface having an uniform temperature distribution can be obtained by such a temperature self-controlling function. According to the present invention, the variation of the film thickness is allowable to the extent of +20%. Therefore, the coating procedure can be manually conducted. Further, the heating temperature is easily adjustable to a desired temperature. This results from the use of the metal oxide of the present invention described above, and is an astonishing effect found out by the present inventors for the first time.

As the metal oxide used in the present invention, there can be mentioned, for example, $V_2O_3$ having an electric specific resistance of 600 to 5,000 $\mu\Omega$cm and a temperature coefficient of electric resistance of about +1.8 $\mu\Omega$cm/°C., $CrO_2$ having an electric specific resistance of 30 to 600 $\mu\Omega$cm and a temperature coefficient of electric resistance of about +1.1 $\mu\Omega$cm/°C., and $ReO_3$ having an electric specific resistance of 20 to 200 $\mu\Omega$cm and a temperature coefficient of electric resistance of about +0.1 $\mu\Omega$cm/°C.

The electric specific resistance of the metal oxide used in the present invention is from about 2% to about 30% of those of carbon powder and the like. The particles having a size of 0.02 to 60 $\mu$m are preferably used, although the size of the particles is determined by considering the dispersibility in the synthetic resin as the binder and so on. In general, the metal oxide having a particle size of less than 0.02 $\mu$m is undesirable, because the electric resistance increases and the wattage per unit area decreases (0.05 to 5 Watt/cm$^2$, about 30° to 350° C. in temperature). When the size of the particles is more than 60 $\mu$m, the powder particles are sometimes heterogeneously dispersed in the coated film.

The synthetic resin used in the present invention may be a thermoplastic, a thermosetting or an electron beam curable resin, and can be suitably selected according to the application fields of the heating unit.

As the thermoplastic resin, there may be used a resin having a softening point of at least 15° C. and an average molecular weight of several thousands to several hundred thousands. As the thermosetting resin or the reactive resin, there may be used a resin having a molecular weight of not more than 200,000 in a state of the existence in the coating liquid. This resin is heated after coating and drying, and accordingly its molecular weight approaches infinity by the reaction such as condensation or addition. For the radiation curable resin, there can be used a resin in which the radical cross-linkable or polymerizable to dryness by the radiation exposure is contained or introduced in the molecules of the thermoplastic resin. Such a radical includes an acrylic double bond contained in acrylic acid, methacrylic acid or an ester thereof, which shows radical polymerizable unsaturated double bond properties, an allylic double bond contained in diallyl phthalate or the like and an unsaturated bond contained in maleic acid, a derivative thereof or the like.

As the synthetic resin, there can be mentioned, for example, a polyimide resin, a polyamide resin, a polyphenylene oxide resin, a silicone resin, a phenol resin, an epoxy resin, a polyparabanic acid resin, a polyurethane resin and polyvinyl chloride resin. The softening temperature or the decomposition temperature of the resin can be selected according to a temperature desired for the coated film.

The ratio of the synthetic resin binder to the metal oxide is variously selected depending on the desired heating temperature, the area of the heating surface, the kind of metal oxide and synthetic resin, the combination thereof and the like. However, the synthetic resin is generally used in the ratio of 30 to 360 parts by weight to 100 parts by weight of the metal oxide powder.

By the use of the above-mentioned synthetic resin as the binder together with the metal oxide of the present invention, the strength of the coated film can be secured and the electric resistance value can be adjusted to 1 to 1,500Ω/□ which is adequate for the heating unit, wherein Ω/□ represents electric resistance value per square area.

When the ratio of the synthetic resin is less than 30 parts by weight, the electric resistance value decreases and the temperature of the heating unit is elevated (therefore, applicable to the heating unit having a large heating surface), but the strength of the coated film is insufficient. On the other hand, when the ratio of the synthetic resin is more than 360 parts by weight, the electric resistance value necessary for heating can not be obtained (because of the excessive electric resistance value), and resultant is unsuitable for the practical use. That is to say, when the electric resistance value is less than 1Ω/□ at ordinary temperature, the electric current excessively flows, and accordingly the temperature becomes too high. In case of more than 1,500Ω/□, the electric current flow becomes too little, and therefore the generation of heat is so depressed that a desired temperature is difficult to be obtained.

In case of a large heating surface, the coating showing a low electric resistance such as 1Ω/□ at ordinary temperature is used. In case of small heating surface, the coating showing a high electric resistance such as 1,500Ω/□ at ordinary temperature is used. According to the present invention, the surface temperature of the heating unit is stably heated at a desired temperature of at most 350° C. for a long period of time by the combination of the compounding in the coating, the thickness of the coated film, the applied potential and the like.

This coating mainly comprising the metal oxide and the synthetic resin is applied by various coating methods such as brushing, roller coating, spray coating, electrostatic coating, electrode position coating and powder coating, or by the dipping method. To the coating, another additive may be added.

The additive includes, for example, a diluting solvent, a suspending agent or a dispersant, an antioxidant, a pigment and another necessary additive.

As the diluting solvent, there is employed the solvent used in the coating such as an aliphatic hydrocarbon, an aromatic petroleum naphtha, an aromatic hydrocarbon (toluene, xylene or the like), an alcohol (isopropyl alcohol, butanol, ethylhexyl alcohol or the like), an ether alcohol (ethyl cellosolve, butyl cellosolve, ethylene glycol monoether or the like), an ether (butyl ether), an acetate, an acid anhydride, an ether ester (ethyl cellosolve acetate), a ketone (methyl ethyl ketone, methyl isobutyl ketone), N-methyl-2-pyrrolidone, dimethylacetamide and tetrahydrofuran. The preferred solvent is suitably selected depending on the synthetic resin as the binder and the metal oxide. The amount of the diluting solvent is selected in the range of 410 parts by weight or below per 100 parts by weight of the resin (metal oxide).

As the suspending agent, there can be mentioned methyl cellulose, calcium carbonate, finely divided bentonite and so on. As the dispersant, there can be used the various surface-active agents such as an anionic surface-active agent (a fatty acid salt, a liquid fatty oil sulfate salt), a cationic surface-active agent (an aliphatic amine salt, a quaternary ammonium salt), an amphoteric surface-active agent and a nonionic surface-active agent. In order to achieve solidification to dryness or curing of the coating or paste with ease in a short-time, a curing agent may be added.

The curing agent is selected according to the resin used, and there may be used a conventional curing agent such as an aliphatic or aromatic polyamine, a polyisocyanate, a polyamide, a polyamine or thiourea.

In addition, a stabilizer, the plasticizer, a antioxidant or the like may be suitably used.

As the substrate in the heating unit of the present invention, there may be used a plastic material, a ceramic material, wood, fiber, paper, a metal material coated with an electric insulator and other solid forming materials. The heating unit of the present invention comprising the solid can be formed in any desired shape, and is prepared by coating or impregnating the desirably shaped solid or solid surface with the coating or paste comprising the metal oxide and synthetic resin above described.

For example, the substrate formed of a metal material coated with an electric insulation, a ceramic material, a plastic material, wood or the combination thereof, whereto at least two metal terminals are securely attached in the opposite positions, is coated with the coating or paste of the present invention to a thickness of 100 μm to 3,000 μm.

The shape of the substrate above described is not particularly limited, which may be a plane surface or a curved surface.

Although it is desirable to coat the substrate surface with a ceramic material, wood is sometimes usable at a desired temperature which is below 150° C. There is also usable a combined article such as a composite comprising wood, a plastic material or a metal and a ceramic material applied thereon.

When the solid surface to be coated is large and there is adopted brushing, roller coating or spray coating, the fluidity of the coating is increased to improve the workability. In this case, the solvent for dilution is preferably incorporated in an amount of less than 410 parts by weight per 100 parts by weight of the conductive powder. If more solvent is incorporated, the coating is too fluid and it is difficult to obtain the prescribed thickness of the coated film. Therefore, the use of excessive solvent is unsuitable for obtaining a desired surface temperature of the coated film.

The coated film is cured or solidified to dryness at a temperature of not more than 350° C., or cured by electron beams (radiation).

When the solidification to dryness or the curing is conducted at a temperature of not more than 350° C. for an ample time, the smooth film having a prescribed thickness can be obtained. At a temperature higher than that, foaming, flowing and deterioration are liable to take place, and at a temperature lower than 70° C., it requires a lot of time.

When the coating is applied to a thickness of 100 to 3,000 μm and then allowed to react to curing at a temperature of not more than 350° C., the coated film solidified to dryness and having a thickness of 70 to 2,000 μm is obtained. This electric resistance heating coated film generated high temperature as well as low temperature. It is preferred that the coating be applied to a thickness of 100 to 3,000 μm. If the thickness is less than 100 μm, the electric resistance increases too high, the wattage per unit area decreases too low, and further the film strength is insufficient. When the thickness is more than 3,000 μm, segregation is liable to occur by the precipitation of particles and a uniform coated film is difficult to obtain. The electric resistance between the metal terminals on this coated film is 1 to 1,500Ω/□ at ordinary temperature as described above. When the electric resistance is low, this film also becomes a conductive film.

If there is fear of leakage, the heating coated film may be covered thinly with an electric insulating film which is just sufficiently thick so that its strength is maintained. A too thick film results in disturbance of heat transfer.

The heating unit is similarly prepared by treating fiber or paper with the coating or paste of the present invention comprising the metal oxide and the synthetic resin.

Also, the heating unit having excellent surface properties can be obtained by the use of the electron beam (radiation) curable resin.

According to the exothermic conducting paste of the present invention, the temperature of the heating unit is adjustable to any desired temperature, by the selection of the kind, the compounding ratio, and the thickness of the coated film as well as the combination thereof, and further by the selection of the heating area or the applied potential.

This is due to the selection of the heat stable metal oxide which is positive in temperature coefficient of electric resistance and has an electric specific resistance of not more than $5\times10^3$ $\mu\Omega$cm in the present invention as described above. The conventional heating element containing carbon black or graphite can not possibly exert this effect.

The exothermic conducting paste has a temperature self-controlling function. Thus it is unnecessary that the thickness of the coated film be precisely made uniform, and the coated film can be manually formed on the solid surface of a desired shape. Further, the heating unit can be prepared by dipping of the impregnable solid material having a desired shape such as fiber or paper. Therefore, the heating unit of the present invention can be widely utilized in various fields such as interior wall application, flooring, roofing, furnace inner surface use, pipe inner and outer surface application, carpets, blankets, simplified heaters, warmers and antifreezers.

The exothermic conducting heating paste of the present invention mainly comprises the synthetic resin and the heat stable metal oxide which is positive in temperature coefficient of electric resistance and has an electric specific resistance of not more than $5\times10^3$ $\mu\Omega$cm. Therefore, there can be prepared therefrom the heating unit which has the temperature self-controlling function, is arbitrarily adjustable to any desired temperature below 350° C., and further has an uniform temperature distribution over a large heating surface as well as a small heating surface, surfaces of various shapes and surfaces containing an uneven surface and the like.

The present invention will now be described in detail with reference to the following examples that by no means limit the scope of the invention. In the following examples, "part" means "part by weight".

EXAMPLE 1

The exothermic conducting heating pastes were prepared by using 30, 45, 65, 75, 80 and 90 parts of silicone resin per 100 parts of $V_2O_3$ (which average particle size was mainly 9 $\mu$m), respectively. Plates which surface had been treated with ceramic material were coated with the exothermic conducting heating pastes, respectively, to a thickness of about 1 mm, and then cured by heating at 90° C. for 2 hours. The characteristics of these heating units are shown in Table 1.

TABLE 1

(room temperature: 10° C.)

| No. | $V_2O_3$ (part) | Silicone resin (part) | Electric resistance (Ω/□) | Heating area and heating temperature 100 V (5 m × 5 m) | 100 V (2 m × 2 m) | 100 V (0.7 m × 0.7 m) | 100 V (0.2 m × 0.2 m) |
|---|---|---|---|---|---|---|---|
| 1 | 100 | 30 | 1.0 | 35° C. | 200° C. | Too high | Too high |
| 2 | " | 45 | 9.5 | Too low | 23° C. | 180° C. | " |
| 3 | " | 65 | 4.3 | " | Too low | 30° C. | " |
| 4 | " | 75 | 110 | " | " | *low Temp. | 250° C. |
| 5 | " | 80 | 200 | " | " | " | 130° C. |
| 6 | " | 90 | 1,300 | " | " | " | 15° C. |

*low temperature

For the heating unit having the composition ratio shown in No.4 and an electric resistance value of 110Ω/□, a potential of 25 V was applied to the opposite both sides of a square of the coated film, with each side 100 mm long. The curve showing the relationship between the time and the temperature of the film surface at that time is given in FIG. 1. (room temperature: 12° C.).

As shown in Table 1, with respect to the exothermic conducting paste of the present invention, its heating temperature varies according to the area of the heating surface and the compounding ratio of the metal oxide and the synthetic resin, and adjustable to a desired temperature by the combination of these factors.

Further, as shown in FIG. 1, the paste of the present invention attains a definite stable heating temperature after the elapse of a definite time.

EXAMPLE 2

Exothermic conducting pastes were prepared by using 150, 220, 270, 290, 310 and 360 parts of polyurethane resin per 100 parts of $V_2O_3$ (which average particle size is 12$\mu$), respectively.

Plates of which surface had been treated with ceramic material were coated with the exothermic conducting pastes, respectively, to a thickness of about 1 mm, and then cured by heating at 110° C. for 3 hours. The characteristics of these heating units are shown in Table 2.

TABLE 2

(room temperature: 0° C.)

| No. | $V_2O_3$ (part) | Poly-urethane resin (part) | Electric resis-tance (Ω/□) | Heating area and Heating temperature 100 V (5 m × 5 m) | 100 V (2 m × 2 m) | 100 V (0.7 m × 0.7 m) | 100 V (0.2 m × 0.2 m) |
|---|---|---|---|---|---|---|---|
| 7 | 100 | 150 | 12 | Too low | Too low | 120° C. | Overheat |
| 8 | " | 220 | 50 | " | " | 14° C. | 130° C. |
| 9 | " | 270 | 280 | " | " | Too low | 55° C. |
| 10 | " | 290 | 400 | " | " | " | 21° C. |
| 11 | " | 310 | 870 | " | " | " | low Temp |
| 12 | " | 360 | 1,530 | " | " | " | " |

For the heating unit having the composition ratio shown in No.10 and an electric resistance value of 400Ω/□), a potential of 65 V was applied to the opposite both sides of a square of the coated film with each side 100 mm long. The curve showing the relationship between the time and the temperature of the film surface at that time is given in FIG. 2 (room temperature: −10° C.).

As shown in Table 2, with respect to the exothermic conducting paste of the present invention, its heating temperature varies according to the area of the heating surface and the compounding ratio of the metal oxide and the synthetic resin, and adjustable to a desired temperature by the combination of these factors.

Figure 2:
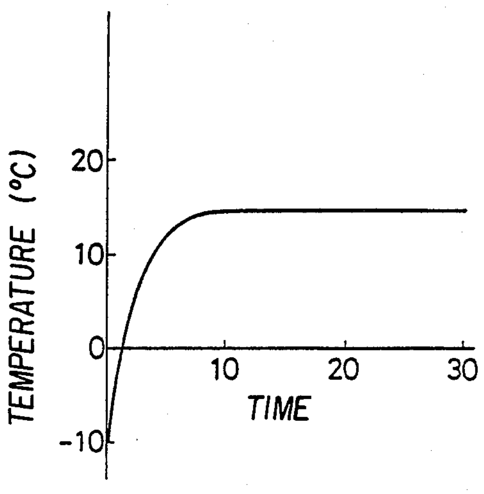

Further, as shown in FIG. 2, the paste of the present invention attains to a definite stable heating temperature after the elapse of a definite time.

EXAMPLE 3

As shown in FIG. 3, a solid 1 having a wavy uneven surface was coated with the heat-resisting ceramic material 6, and the metal terminals 3 were securely fitted thereto. There was applied thereon the exothermic conducting paste wherein 80 parts of the epoxy resin, 20 parts of methyl ethyl ketone as the diluent and 3 parts of the polymeric ester dispersant (Dispalon 360031, manufactured by Kusumoto Kasei) per 100 parts of $V_2O_3$, of which particle size was mainly about 9 μm were compounded, and the cured coated film 7 having a thickness of about 0.5 mm was fixed.

When a potential of 100 V was applied between the terminals spaced at a distance of 1,500 mm, there was obtained the approximately uniform temperature distribution 8 ranging from 175° to 178° C. over the whole surface.

EXAMPLE 4

As shown in FIG. 4, an frusto-conical metal solid 1 with a level of a wide angle, wherein a diameter of the top is 400 mm, a diameter of the base is 500 mm and an altitude is 1,000 mm, was coated with the heat-resisting ceramic material 6, and the metal terminals 3 were securely fitted thereto. There was applied thereon the exothermic conducting paste having a viscosity of about 1,700 CP wherein 100 parts of the mixed powder of 90% $V_2O_3$ and 10% $CrO_2$, of which particle size was 0.025 to 10 μm, and 200 parts of the mixed binder consisting of 22 parts of the epoxy resin with a softening point of 140° C. and 78 parts of ethyl cellosolve of the diluting agent. The cured coated film 7 having a thickness of 1.2 mm at the larger diameter portion and a thickness of 1.0 mm at the smaller diameter portion was fixed.

When a potential of 100V was applied between the terminals, there was obtained the approximately uniform temperature distribution ranging from 110° to 115° C. over the whole surface. The somewhat similar result could also be obtained, when $CrO_2$ was substituted for $ReO_3$.

EXAMPLE 5

The exothermic conducting paste 7 with a viscosity of about 1,600 cp was prepared by blending 100 parts of a mixed powder of 90% $V_2O_3$ and 10% $CrO_2$, which particle size was 0.025 to 20 μm, and 200 parts of the mixed binder consisting of 20% epoxy resin with a softening point of 140° C. and 80% xylene as the diluting agent. As shown in FIG. 5, the plastic solids 1 were coated with the paste to thicknesses of (a) about 1 mm and (b) about 3.5 mm. After curing, the cross section of the coated films were examined.

In case of the thin film (a), the electro-conductive particles 5 were approximately homogeneously dispersed. However, in case of the thick film (b), the particles 5 segregated by precipitation to give heterogeneous properties, showing a difference of about 10% in strength and electric resistance value between the upper part and the lower part of the coated film.

The paste was applied to a thickness of about 3 mm with an error of about 2%.

EXAMPLE 6

A paste wherein 110 parts of the mixed binder of 70% epoxy resin and 30% methyl ethyl ketone as the diluting agent per 100 parts of $V_2O_3$, of which size was mainly about 9 μm had been compounded was applied on the wood coated with ceramic material. After the curing reaction at a temperature of 140° C., 1 mm-thick coated film was obtained. When a potential of 70V was applied between the terminals spaced at a distance of 800 mm, a temperature of 100° C. was stably obtained (see 10 in FIG. 6).

A paste wherein 150 parts of a silicone resin containing 40% toluene as the diluting agent was compounded in 100 parts of a mixed powder of 80% $V_2O_3$ and 20% $CrO_2$, which particle size was 0.025 to 20 μm, was applied on a heat-resisting resin solid coated with ceramic material. After solidification to dryness, a 1 mm-thick coated film was obtained. When a potential of 100 V was applied between the terminals spaced at a distance of 800 mm, a temperature of 170° C. was stably obtained (see 11 in FIG. 6).

A coating wherein 180 parts of a polyparabanic acid resin containing 80% N-methyl pyrrolidone as the diluting agent and 10% of the suspending agent (bentonite having a particle size of 1 to 7μ) were compounded in 100 parts of a mixed powder of 70% $V_2O_3$ and 30% $CrO_2$ was applied on a ceramic solid. After curing, a 0.5 mm-thick coated film was obtained. When a potential of 100 V was applied between the terminals spaced at a distance of 800 mm, a temperature of 230° C. was stably obtained (see 12 in FIG. 6).

FIG. 6 is a graph which shows the relationship between the electric resistance (Ω/□) and the temperature of the heating units on which the coatings of the present invention are applied, when potentials of 70 V and 100 V are applied thereto. This shows that the electric resistance begins to increase with the increase of the temperature, gradually followed by the steep increase, whereby the electric current decreases, and that the temperature reaches a temperature at which the heating value comes to equilibrium with the heat dissipation value.

EXAMPLE 7

A 0.2 mm-thick fabric of glass fibers into which copper wires were sewn at a space of 200 mm was dipped in a conducting paste wherein 200 parts of a mixed binder of 60% epoxy resin containing a curing agent and 40% acid anhydride was incorporated in 100 parts of $V_2O_3$ which particle size was about 9 μm. After a curing reaction at a temperature of 100° C., a 0.4 mm-thick electro-conductive fabric was obtained.

When a potential of 60 V was applied between the terminals, a temperature of 27° C. was obtained at room temperature of 5° C. after 10 minutes.

In the case wherein similar test was conducted for the 0.2 mm-thick Japanese paper, a temperature of 39° C. was obtained. These fabrics could be bent through 180°.

EXAMPLE 8

Both faces of a 0.85 mm-thick fabric of glass fibers into which 3 silver wires with a diameter of 0.16 mm were sewn at the opposite sides thereof were coated with a mixed slurry of 10 g of a flexible epoxy resin containing the curing agent and 12 g of $CrO_2$ containing 20% xylene. The flexible fabric of a square with each side 10 cm long was prepared, and then heat treated at a temperature of 120° C. for 3 hours. The resultant fabric showed an electric resistance value of 3,050Ω at a temperature of 20° C. When a potential of 100 V was applied, a stable temperature of 32° C. was attained after 15 minutes. The waterproof heat insulating fabric was obtained by dipping the electro-conductive flexible fabric in the epoxy resin and then forming the film with a thickness of 0.1 mm thereon.

This invention relates to the paste or coating mainly comprising the synthetic resin and the heat stable metal oxide which is positive in temperature coefficient of electric resistance and has an electric specific resistance of not more than $5\times10^3$ μΩcm at ordinary temperature. Therefore, there can be prepared therefrom the heating unit which has the temperature self-controlling function, and further has an uniform temperature distribution over a large heating surface as well as a small heating surface in various shapes and surfaces containing an uneven surface and the like, even if the thickness of the coated film is uneven. Moreover, the paste of the present invention is adjustable to any desired temperature below 350° C., and the heating units having various shapes which are applicable in various fields can be easily produced from this paste. Therefore, the present invention can be said to be excellent in many respects.

We claim:

1. An exothermic conducting paste consisting of synthetic resin and a heat stable metal oxide, said metal oxide having a positive temperature coefficient of electric resistance, an electric specific resistance of not more than $5\times10^3$ μΩcm at ordinary temperature and is selected from the group consisting of $V_2O_3$, $CrO_2$ and mixtures thereof, and said synthetic resin is contained in an amount of 30 to 360 parts by weight per 100 parts by weight of the metal oxide.

2. An exothermic conducting paste as defined in claim 1, wherein the synthetic resin is selected from the group consisting of a silicone resin, an urethane resin, an epoxy resin, a polyparabanic acid resin and a polyimide resin.

3. An electric resistance heating unit wherein a desirably shaped solid or solid surface is coated or impregnated with a coating or paste, said coating or paste consisting of a synthetic resin and a heat stable metal oxide, said metal oxide having a positive temperature coefficient of electric resistance, an electric specific resistance of not more than $5\times10^3$ μΩcm, and is selected from the group consisting of $V_2O_3$, $CrO_2$ and mixtures thereof, and said synthetic resin is contained in an amount of 30 to 360 parts by weight per 100 parts by weight of the metal oxide.

4. An electric resistance heating unit as defined in claim 3, wherein the shaped solid or solid surface is coated with a ceramic material before being coated with the paste.

* * * * *